UNITED STATES PATENT OFFICE.

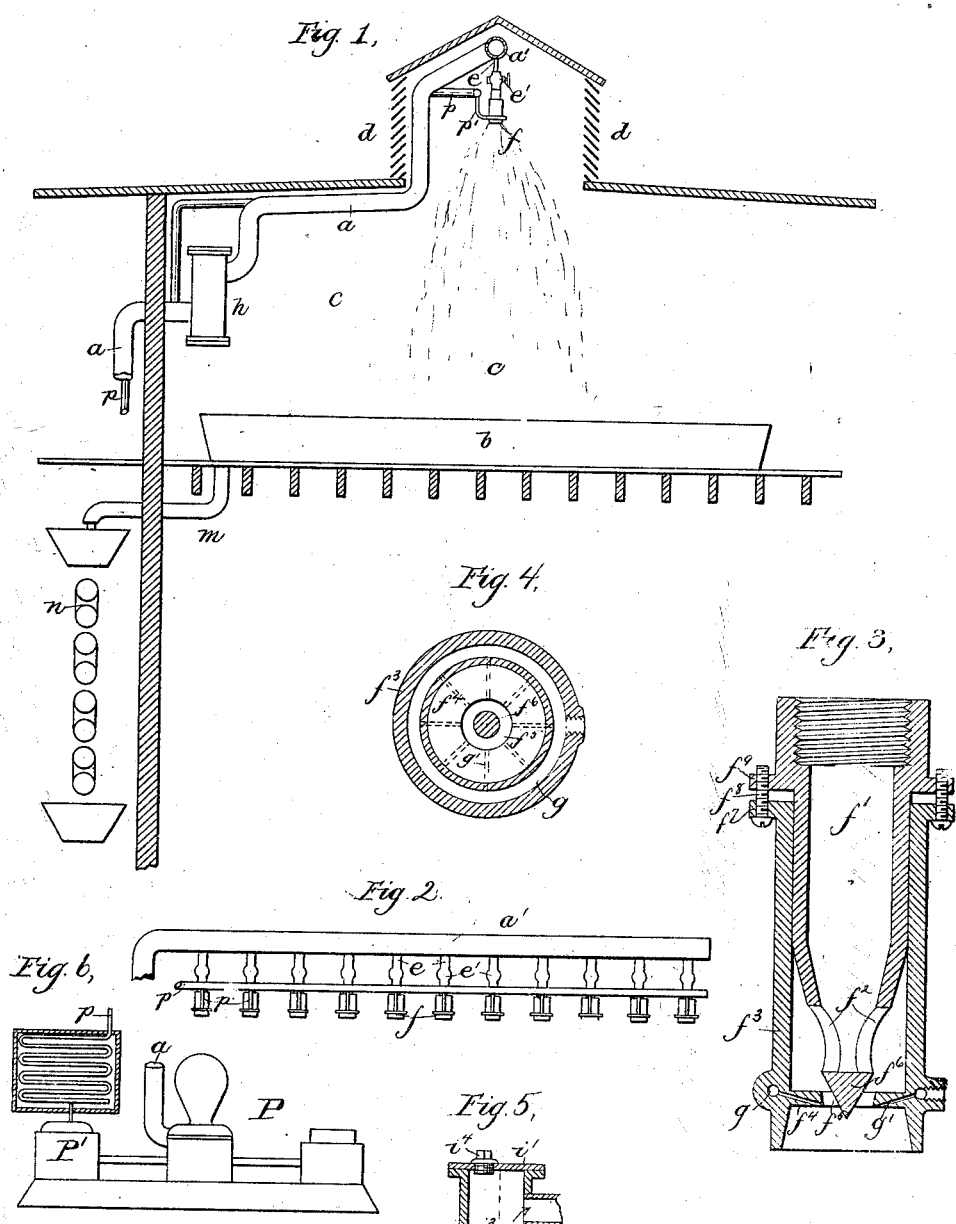

CLARENCE C. HANFORD, OF MEDFORD, MASSACHUSETTS.

APPARATUS FOR COOLING LIQUIDS.

SPECIFICATION forming part of Letters Patent No. 382,156, dated May 1, 1888.

Application filed April 3, 1888. Serial No. 269,462. (No model.) Patented in England November 16, 1886, No. 14,873, and in France March 23, 1887, No. 182,370.

*To all whom it may concern:*

Be it known that I, CLARENCE C. HANFORD, of Medford, county of Middlesex, and State of Massachusetts, have invented an Improvement in Apparatus for Cooling Liquids, (the same having been patented in England November 16, 1886, No. 14,873, and in France March 23, 1887, No. 182,370,) of which the following description, in connection with the accompanying drawings, is a specification, like letters on the drawings representing like parts.

This invention relates to an apparatus for cooling liquids, which is especially applicable in the manufacture of malt liquors—such as beer, ale, &c., in which the liquid has to be cooled from the boiling-point to about 50° or 60° Fahrenheit before the final operations can be performed upon it.

The invention consists in an apparatus for spraying under pressure the liquid to be cooled through the atmosphere, and in some cases in conjunction with compressed air, substantially as hereinafter particularly set forth and claimed.

Figure 1 is a sectional view of a building provided with means for cooling liquids in accordance with this invention; Fig. 2, a side elevation of a portion of the appliances for cooling the liquid; Figs. 3 and 4, enlarged sectional details of one of the spraying devices; Fig. 5, a sectional detail of a straining apparatus through which the liquid passes on its way to the spraying devices, and Fig. 6 an elevation of the pump for forcing the liquid.

The heated liquid to be cooled is forced in the usual manner through a pipe, $a$, which, instead of discharging directly into the usual vat, $b$, is, as shown in this instance, carried to a point above the said vat and terminates in a horizontal portion, $a'$, which may be ten or fifteen feet long, extending over the vat $b$, which is usually twenty or thirty feet in length and breadth. The room $c$, containing the cooling-vat $b$, is usually in the top of the building, and, as shown in this instance, is provided with a ventilator, $d$, extending along the roof of the building above the vat $b$, and provided with open sides, which may have the usual inclined slats, as shown, to permit the external air to enter the ventilator and building, while excluding rain or snow. The pipe $a'$ is provided with a series of downwardly-extending branches, $e$, which may be provided with stopcocks or valves $e'$ and terminate in nozzles or spraying devices $f$, properly constructed to deliver the liquid in a finely-divided shower or spray, the said spray falling naturally and being collected by the vat $b$.

The nozzles or spraying devices may be of any suitable or usual construction, being shown in this instance as consisting of a hollow piece, $f'$, (see Fig. 3,) threaded at its upper end, or otherwise adapted to be attached to the branch pipes $e$, and provided near its lower end with lateral ports $f^2$, through which the liquid passes into a sleeve, $f^3$, surrounding the piece $f'$, and provided with a transverse partition or diaphragm, $f^4$, having an opening, $f^5$. The inward or stationary piece $f'$ of the spraying devices is provided at its end with a conical projection, $f^6$, that enters the opening $f^5$ in the partition $f^4$ of the sleeve $f^3$, and thus produces an annular orifice, through which the liquid passing through the ports $f^2$ into the sleeve may escape.

The size of the annular orifice may be varied by changing the position of the partition $f^4$ with relation to the cone $f^6$, and for this purpose the sleeve $f^3$ is made movable on the part $f'$, and, as shown in this instance, is provided with a projection or flange, $f^7$, connected by adjusting devices or screws $f^8$ with the corresponding flange, $f^9$, on the part $f'$, so that the sleeve, and consequently the partition $f^4$, may be raised or lowered by the adjusting-screws $f^8$ with relation to the cone $f^6$, thus varying the width of the annular space of the orifice between the cone $f^6$ and the edge of the opening $f^5$. By this means a spray of any desired fineness may be produced.

In order to prevent clogging of the spraying devices, the pipe $a$ is provided with a strainer, $h$, which may be made, as shown in Fig. 5, of a cylinder, $i$, having removable bonnets $i'$ $i^2$ and a longitudinal partition, $i^3$, composed of perforated or foraminous plates of various degrees of fineness.

The liquid enters the cylinder through the pipe $a$ at one side of the strainer-partition $i^3$ and passes out at the other side, as shown by the arrows, thus having to pass through the partition $i^3$, which removes all particles of sufficient size to clog or interfere with the proper operation of the spraying devices. The bonnets $i'$ $i^2$ on the inlet side of the partition $i^3$ may be provided with removable plugs $i^4$, so that when the said plugs are removed a stream of water may be directed from a hose or otherwise into the upper opening and against the surface of the plate $i^3$ to wash off the sedimentary matter that may have collected there, carrying the same out through the opening in the lower bonnet.

The liquid that falls into the vat $b$ may be taken therefrom by a pipe, $m$, and caused to drip or trickle over the usual cooling-pipes, $n$; but its temperature will have been so far reduced by falling as a spray into the vat $b$ that it would be unnecessary to use ice to cool the water circulating through the cooling-pipes, as water at the ordinary temperature taken from the street-main will be sufficient to cool the liquid to the desired temperature.

The natural circulation of air provided by the ventilator $d$ will in many cases be sufficient to cool the liquid the requisite amount; but it may sometimes be necessary or desirable to expose the spray to a lower temperature than the natural temperature of the air. For this purpose an air-pipe, $p$, may be provided, shown as having small branches $p'$ leading to the spraying devices and entering chambers $g$ in the sleeves $f^3$, which chambers have fine outlet-passages $g'$, through which the air may escape into the liquid issuing around the said cone. Air under compression is forced into the said pipe $p$, which will, by its expansion on issuing from the said orifices, absorb a large amount of heat, and thus greatly increase the cooling effect on the spray of hot liquid.

The pump P (indicated in side elevation in Fig. 6) may have the rod of its actuating-piston connected with the piston or plunger that forces the liquid through the pipe $a$, and also connected with a piston or plunger that operates the air-compressor P', by which compressed air is forced through the pipe $p$, the said pipe being shown as having a coil inclosed in a chamber containing cold water for the purpose of removing the heat from the air produced by compressing the same. By this arrangement the liquid and compressed air for cooling the same will be forced simultaneously by the same pumping-engine or forcing apparatus. The pump will force the liquid with sufficient pressure to cause it to be delivered from the spraying devices in the form of a fine spray, mist, or vapor, which settles gently in the vat, and collects without foaming, although the collected liquor is thoroughly exposed to the air in falling, and thus aerated in addition to having its temperature lowered.

If one of the spraying devices $f$ should become clogged or fail to operate properly, the corresponding valve, $e'$, may be closed and the spraying device removed and another substituted without stopping the operation of the remainder of the apparatus.

The arrangement of the spraying devices with relation to the valve and other parts may be varied according to the requirements of each particular case.

In some cases it might be desirable to place the pipe $a'$ at a lower level and cause the spraying devices to throw the divided liquid upward instead of downward, as shown in this instance.

The process of cooling liquids herein set forth forms the subject of my application for patent, Serial No. 249,755, filed September 15, 1887, entitled "Art of Making Malt Liquors."

I claim—

1. The combination of a liquid-forcing apparatus, and a pipe leading therefrom, with a series of spraying devices or atomizers connected with said pipe and opening directly into the atmosphere, and an independent or disconnected vat or collecting-receptacle arranged below said spraying devices to receive the liquid therefrom after passing from the spraying device through the atmosphere, substantially as described.

2. The combination of a liquid-forcing apparatus, a delivery-pipe, $a'$, connected therewith, a series of atomizers attached to said delivery-pipe and opening directly into the atmosphere, and a valve interposed between each atomizer and the delivery-pipe, so as to admit of the individual detachment of each atomizer independently of all others, and an independent or disconnected vat arranged a suitable distance below said atomizers, so that the spray from the atomizers will have to pass some distance through the free atmosphere before being collected in the vat, substantially as described.

3. The combination, substantially as shown and described, of a liquid-forcing apparatus, a delivery-pipe leading therefrom, atomizers connected to said pipe, a straining device interposed in said pipe between the pump and the atomizers, and a vat below said atomizers, substantially as described.

4. The combination of a forcing apparatus and delivery-pipe leading therefrom, and spraying devices communicating with the said pipe, with a ventilator affording a natural current of air through the spray delivered from said spraying devices, and a vat below said spraying devices, substantially as described.

5. The combination, with a forcing apparatus and liquid-delivery pipe leading therefrom, and spraying devices communicating with the said pipe, of an air-compressor and delivery-pipe provided with orifices adjacent to those of the spraying devices, substantially as described.

In testimony whereof I have signed my name to this specification in the presence of two subscribing witnesses.

CLARENCE C. HANFORD.

Witnesses:
  JOS. P. LIVERMORE,
  JAS. J. MALONEY.